United States Patent
Cheng et al.

(10) Patent No.: US 11,122,926 B2
(45) Date of Patent: Sep. 21, 2021

(54) COOKING VESSEL WITH A THERMAL SENSOR

(71) Applicant: Meyer Intellectual Properties Ltd., Kowloon (HK)

(72) Inventors: Stanley Kin Sui Cheng, Hillsborough, CA (US); Jonathan A. Jenkins, Seattle, WA (US); Darren Erik Vengroff, Seattle, WA (US)

(73) Assignee: Meyer Intellectual Properties Limited

( * ) Notice: Subject to any disclaimer, the term of this patent is extended or adjusted under 35 U.S.C. 154(b) by 0 days.

(21) Appl. No.: 16/707,713

(22) Filed: Dec. 9, 2019

(65) Prior Publication Data

US 2020/0107665 A1    Apr. 9, 2020

Related U.S. Application Data

(62) Division of application No. 15/427,677, filed on Feb. 8, 2017, now Pat. No. 10,499,759.

(60) Provisional application No. 62/294,088, filed on Feb. 11, 2016.

(51) Int. Cl.
| | |
|---|---|
| *A47J 27/00* | (2006.01) |
| *A47J 45/06* | (2006.01) |
| *H05B 6/06* | (2006.01) |
| *A47J 36/32* | (2006.01) |
| *G01K 1/14* | (2021.01) |
| *G01K 13/00* | (2021.01) |

(52) U.S. Cl.
CPC ........... *A47J 27/002* (2013.01); *A47J 36/321* (2018.08); *A47J 45/061* (2013.01); *A47J 45/068* (2013.01); *G01K 1/14* (2013.01); *G01K 13/00* (2013.01); *H05B 6/062* (2013.01); *G01K 2207/08* (2013.01); *H05B 2213/06* (2013.01)

(58) Field of Classification Search
CPC ...... A47J 27/002; A47J 45/061; A47J 45/068; A47J 36/321; H05B 6/062; H05B 2213/06; G01K 1/14; G01K 13/00; G01K 2207/08; G01K 2207/02; Y10S 220/912
USPC ................................................. 220/571–574
See application file for complete search history.

(56) References Cited

U.S. PATENT DOCUMENTS

| | | | | |
|---|---|---|---|---|
| 4,535,229 | A * | 8/1985 | Wolf ..................... | A47J 36/321 219/440 |
| 5,441,344 | A * | 8/1995 | Cook, III ................ | A47J 43/28 374/141 |

(Continued)

FOREIGN PATENT DOCUMENTS

CN          204717783 U   * 10/2015

*Primary Examiner* — Brandi N Hopkins
*Assistant Examiner* — Janice M Soto
(74) *Attorney, Agent, or Firm* — Akerman LLP

(57) ABSTRACT

According to one example, a cookware apparatus includes a vessel. The vessel includes a bottom, and a sidewall surrounding the bottom and extending upward from the bottom so as to form a fluid retaining interior region. The sidewall terminates at a rim. The vessel also includes a channel extending through a portion of the bottom and further extending upward into and through a portion of the sidewall. The channel has an opening positioned in an external surface of the sidewall. The cookware apparatus further includes a thermal sensor positioned within the channel. The thermal sensor extends through the portion of the bottom and further extends upward into and through the portion of the sidewall.

10 Claims, 8 Drawing Sheets

(56) References Cited

U.S. PATENT DOCUMENTS

| | | | | |
|---|---|---|---|---|
| 7,157,675 B2* | 1/2007 | Imura | ............... | A47J 36/321 |
| | | | | 219/627 |
| 2011/0268153 A1* | 11/2011 | He | ............... | A47J 37/108 |
| | | | | 374/179 |
| 2015/0208858 A1* | 7/2015 | Robbins | ............... | A47J 36/00 |
| | | | | 426/231 |

* cited by examiner

COOKING VESSEL WITH A THERMAL SENSOR

CROSS-REFERENCE TO RELATED APPLICATIONS

This patent application is a divisional of U.S. patent application Ser. No. 15/427,677 filed Feb. 8, 2017 entitled "Cooking Vessel with a Thermal Sensor" which itself claims priority from U.S. Provisional Patent Application No. 62/294,088 filed Feb. 11, 2016, the entirety of both of which are incorporated herein by reference.

TECHNICAL FIELD

This disclosure relates generally to the field of cooking devices and more specifically to a cooking vessel with a thermal sensor.

BACKGROUND

Cooking involves heating a food item to a sufficient temperature for a duration of time to cause a transformation of the food item to a tastier, more edible, and/or more digestible form. The process of heating a food item, however, may be problematic due to the inherent dynamic changes caused by removing or adding ingredients to a pot or pan, as well as the changes in heat capacity of the food item as water is released by the food item and evaporated. Skilled chefs may overcome these issues by using experience to judge the output of a heat source, with a particular pot or pan, as well as using the change in appearance and texture of the food item to determine doneness. Unfortunately, less experienced cooks frequently make mistakes when heating a food item, such as putting the food item in a pan before it is hot enough to sear the surface, undercooking the food item, or overcooking the food item.

To assist in cooking, thermal sensors may be embedded in cookware. These thermal sensors may allow a user to determine a temperature associated with the cooking processes. Unfortunately, typical thermal sensor positioning in cookware, and typical methods for embedding thermal sensors in cookware may be deficient.

SUMMARY

A first aspect of the invention is characterized by a cookware apparatus, comprising: a vessel, comprising: a bottom; a sidewall surrounding the bottom and extending upward from the bottom so as to form a fluid retaining interior region, the sidewall terminating at a rim; and a channel extending through a portion of the bottom and further extending upward into and through a portion of the sidewall, the channel having an opening positioned in an external surface of the sidewall; a thermal sensor positioned within the channel, the thermal sensor extending through the portion of the bottom and further extending upward into and through the portion of the sidewall, the thermal sensor comprising: a thermal sensing device positioned in the to portion of the bottom; and one or more sensor leads communicatively coupled to the thermal sensing device, the one or more sensor leads extending from the portion of the bottom upward into and through the portion of the sidewall, the one or more sensor leads further extending out of the opening of the channel, extending within a flange of a handle, extending within the handle, and being coupled to an electronic circuit; the handle coupled to the vessel by the flange, the flange being positioned over the opening of the channel; and the electronic circuit positioned on or in the handle, the electronic circuit being operable to receive one or more signals from the thermal sensor and further operable to determine a temperature associated with the vessel based on the one or more signals.

A second aspect of the invention is characterized by a cookware apparatus, comprising: a vessel, comprising: a bottom; a sidewall surrounding the bottom and extending upward from the bottom so as to form a fluid retaining interior region, the sidewall terminating at a rim; and a channel extending through a portion of the bottom and further extending upward into and through a portion of the sidewall, the channel having an opening positioned in an external surface of the sidewall; and a thermal sensor positioned within the channel, the thermal sensor extending through the portion of the bottom and further extending upward into and through the portion of the sidewall.

Another aspect of the invention is any such apparatus further comprising: a handle coupled to the vessel; and an electronic circuit positioned on or in the handle, the electronic circuit being communicatively coupled to the thermal sensor, the electronic circuit being operable to receive one or more signals from the thermal sensor and further operable to determine a temperature associated with the vessel based on the one or more signals.

Another aspect of the invention is any such apparatus wherein: the thermal sensor comprises: a thermal sensing device; and one or more sensor leads communicatively coupled to the thermal sensing device; and the apparatus further comprises an electronic circuit communicatively coupled to the sensor leads of the thermal sensor, the electronic circuit being operable to receive one or more signals from the thermal sensor and further operable to determine a temperature associated with the vessel based on the one or more signals.

Another aspect of the invention is any such apparatus wherein the thermal sensing device is positioned in the portion of the bottom, and the one or more sensor leads extend from the portion of the bottom upward into and through the portion of the sidewall so as to communicatively couple to the electronic circuit.

Another aspect of the invention is any such apparatus wherein the thermal sensing device extends from the portion of the bottom upward into and through a first area of the portion of the sidewall, and the one or more sensor leads extend from the first area of the portion of the sidewall into and through a second area of the portion of the sidewall so as to communicatively couple to the electronic circuit.

Another aspect of the invention is any such apparatus further comprising: a handle coupled to the vessel by a flange of the handle, the flange being positioned over the opening of the channel; wherein the electronic circuit is positioned on or in the handle; and wherein a portion of the thermal sensor extends out of the opening of the channel, extends within the flange, extends within the handle, and is coupled to the electronic circuit.

Another aspect of the invention is any such apparatus wherein the thermal sensing device is a thermocouple, a thermistor, a thermopile, a Surface Acoustic Waves sensor, or a Bulk Acoustic Waves sensor.

Another aspect of the invention is any such apparatus wherein the vessel is a pot, a pan, a skillet, a sauté pan, a stock pot, or a chefs pan.

Another aspect of the invention is any such apparatus wherein the portion of the bottom of the vessel is monolithic.

A third aspect of the invention is characterized by a method, comprising: providing a preform, the preform having: a first bottom with a first diameter; and a first upward extending sidewall surrounding the first bottom and extending upward from the first bottom so as to form a fluid retaining interior region of the preform, the first sidewall terminating at a first rim and having a first height; forming a first channel in the first bottom, the first channel having an opening in an external surface of the first bottom; drawing the preform into the shape of a vessel, the vessel having: a second bottom with a second diameter that is smaller than the first diameter; a second upward extending sidewall surrounding the second bottom and extending upward from the second bottom so as to form a fluid retaining interior region of the vessel, the second sidewall terminating at a second rim and having a second height that is greater than the first height; and a second channel extending through a portion of the second bottom and further extending upward into and through a portion of the second sidewall, the second channel having an opening positioned in an external surface of the second sidewall; positioning a thermal sensor within the second channel so that a thermal sensing device of the thermal sensor is positioned within the portion of the second bottom, and further so that one or more sensor leads of the thermal sensor extend from the portion of the second bottom upward into and through the portion of the second sidewall, and further so that the one or more sensor leads extend out of the opening in the external surface of the second sidewall; routing the one or more sensor leads within a flange of a handle; coupling the flange of the handle to the vessel, wherein the flange is coupled to the vessel in a position over the opening in the external surface of the second sidewall, wherein an electronic circuit is positioned on or in the handle; and coupling the one or more sensor leads to the electronic circuit.

A fourth aspect of the invention is characterized by a method, comprising: providing a preform, the preform having: a first bottom with a first diameter; a first upward extending sidewall surrounding the first bottom and extending upward from the first bottom so as to form a fluid retaining interior region of the preform, the first sidewall terminating at a first rim and having a first height; and a first channel formed in the first bottom and having an opening in an external surface of the first bottom; changing the preform into the shape of a vessel, the vessel having: a second bottom with a second diameter that is smaller than the first diameter; a second upward extending sidewall surrounding the second bottom and extending upward from the second bottom so as to form a fluid retaining interior region of the vessel, the second sidewall terminating at a second rim and having second height that is greater than the first height; and a second channel extending through a portion of the second bottom and further extending upward into and through a portion of the second sidewall, the second channel having an opening positioned in an external surface of the second sidewall; and positioning a thermal sensor within the second channel, the thermal sensor extending through the portion of the second bottom and further extending upward into and through the portion of the second sidewall.

Another aspect of the invention is any such method further comprising forming the first channel in the first bottom of the preform.

Another aspect of the invention is any such method further comprising forming the preform from a disk.

Another aspect of the invention is any such method wherein changing the preform into the shape of the vessel comprises drawing the preform into the shape of the vessel.

Another aspect of the invention is any such method further comprising: coupling a handle to the vessel, the handle having an electronic circuit positioned on or in the handle; and coupling a portion of the thermal sensor to the electronic circuit.

Another aspect of the invention is any such method wherein coupling the handle to the vessel comprises coupling a flange of the handle to the vessel, wherein the flange is coupled to the vessel in a position over the opening in the external surface of the second sidewall.

Another aspect of the invention is any such method wherein the thermal sensor comprises: a thermal sensing device; and one or more sensor leads communicatively coupled to the thermal sensing device.

Another aspect of the invention is any such method further comprising: coupling a handle to the vessel, the handle having an electronic circuit positioned on or in the handle; and coupling the one or more sensor leads to the electronic circuit.

Another aspect of the invention is any such method wherein the vessel is a pot, a pan, a skillet, a sauté pan, a stock pot, or a chefs pan.

A fifth aspect of the invention is characterized by a cookware apparatus, comprising a vessel, comprising: a bottom; a sidewall surrounding the bottom and extending upward from the bottom so as to form a fluid retaining interior region, the sidewall terminating at a rim; and a channel extending through a portion of the bottom and further extending upward into and through a portion of the sidewall, the channel having an opening positioned in an external surface of the sidewall; a heat pipe positioned within the channel, the heat pipe extending through the portion of the bottom and further extending upward into and through the portion of the sidewall; and a thermal sensor positioned within the channel and coupled to the heat pipe at the portion of the sidewall.

Another aspect of the invention is any such apparatus wherein the heat pipe is a solid metal heat pipe.

Another aspect of the invention is any such apparatus wherein the heat pipe is a copper pipe or a silver pipe.

A sixth aspect of the invention is achieved by a process for forming a cooking vessel, the process comprising the steps of at least one of providing and forming a first perform vessel from a disk, the first perform having a base with a first diameter and upward extending walls that terminate at a first rim, forming a lateral channel in the base of the first perform, drawing the preform with the channel into the shape of a vessel, the vessel having a base with a second diameter that is smaller than the first diameter and upward extending wall that terminate at a second rim, wherein the lateral channel is deformed to a curvilinear shape that extend at least partially upward in the walls of the vessel having an entry orifice in the sidewall thereof, routing a thermal sensor and pliable lead into the curvilinear channel via the entry orifice in the vessel, covering an exposed portion of the pliable lead and the entry orifice.

A seventh aspect of the invention is characterized by an article of cookware, comprising a cookware vessel having a substantially horizontal bottom, substantially upright sidewall extending upward there from to terminate at a rim, the sidewall encircling said bottom to form a fluid retaining interior region, a thermal sensor embedded in the horizontal bottom, having one or more sensor leads that extend within the bottom and sidewall of the vessel to exit for connection to a receptive circuit at the level of a handle, wherein the vessel is at least partly monolithic and the portion of the vessel containing the conduit for the sensor is in the at least partly monolithic portions.

BRIEF DESCRIPTION OF THE FIGURES

For a more complete understanding of the present disclosure and one or more examples of the features and advantages of the present disclosure, reference is now made to the following description, taken in conjunction with the accompanying drawings, in which.

DETAILED DESCRIPTION

Embodiments of the present disclosure are best understood by referring to FIGS. 1A-6 of the drawings, like numerals being used for like and corresponding parts of the various drawings.

Figure 1A:
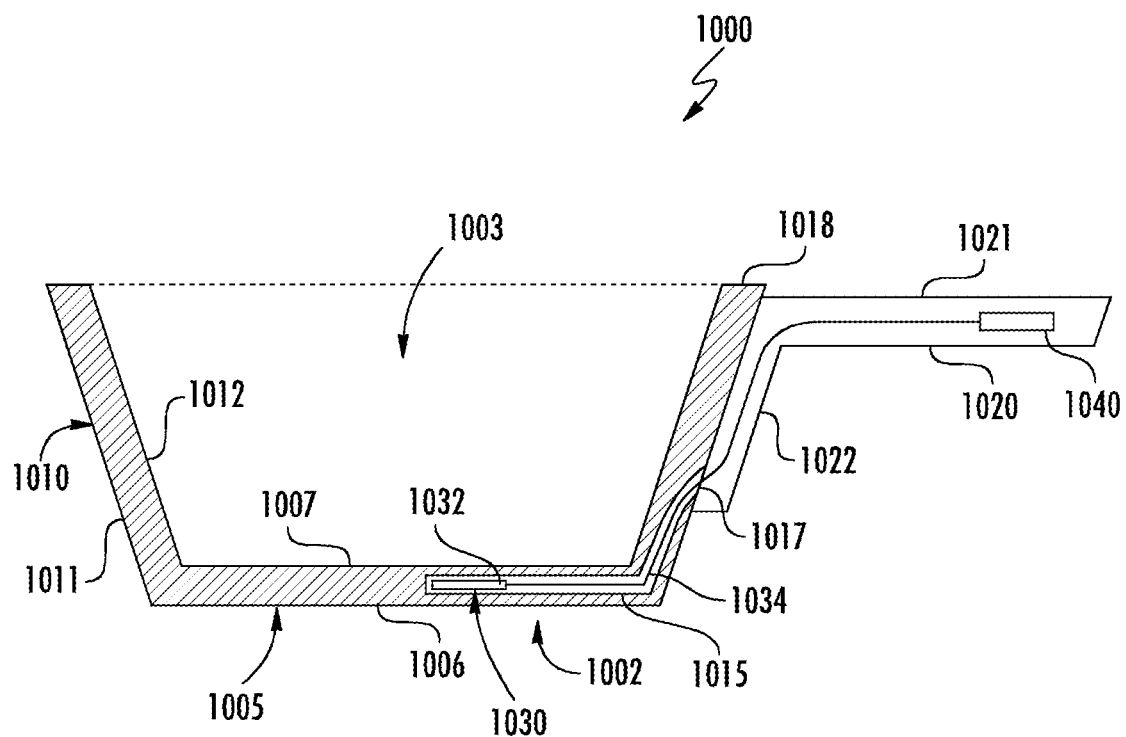
FIG. 1A is a cross-sectional view of an example cooking apparatus having a thermal sensor.

FIG. 1A is a cross-sectional view of an example cooking apparatus having a thermal sensor. As is illustrated, the cooking apparatus 1000 includes a vessel 1002. The vessel 1002 has a bottom 1005, a sidewall 1010 that extends upward from the bottom 1005, and a channel 1015 that extends through a portion of the bottom 1005 and further extends upward into and through a portion of the sidewall 1010. The cooking apparatus 1000 further includes a thermal sensor 1030 positioned within the channel 1015, so that the thermal sensor 1030 also extends through the portion of the bottom 1005 and further extends upward into and through the portion of the sidewall 1010.

In some examples, the positioning of the thermal sensor 1030 may allow the thermal sensor 1030 to be located at an area in the vessel 1002 that is most (or more) representative of the food exposure temperature (e.g., the temperature that a food item is exposed to as a result of being cooked in the vessel 1002). For example, the thermal sensor 1030 may be positioned at or near a center point of the bottom 1005 of the vessel 1002, or positioned halfway between the center point of the bottom 1005 and the sidewall 1010. In such examples, the thermal sensor 1030 may be more likely to provide an accurate measurement of the food exposure temperature. In contrast to this, some prior cooking vessels would typically include the thermal sensor in only the vessel sidewall or the vessel lid (as opposed to the vessel bottom), which could inhibit the ability of the sensor to determine an accurate food exposure temperature.

Furthermore, in some examples, the positioning of the thermal sensor 1030 may also allow the thermal sensor 1030 to extend upward into and through a portion of the sidewall 1010, so as to be located in-line with (or at the same level as) the handle 1020. In some examples, this may allow a portion of the thermal sensor 1030 to extend out of the vessel 1002 and further extend into the handle 1020 without the thermal sensor 1030 being left exposed to the air and heat outside of the vessel 1002. This may also prevent the cooking apparatus 1000 from requiring a large, bulky flange and/or handle to cover the portion of the thermal sensor 1030 that extends out of the sidewall 1010, in some examples. In contrast to this, some prior cooking vessels with a thermal sensor positioned in the bottom of the vessel may have sensor leads that exit the vessel at virtually the bottom of the vessel, thereby exposing the sensor leads to the air and heat outside of the vessel. An example of this may be seen in U.S. Pat. No. 6,206,564, issued Mar. 27, 2001 to Adamczewski (which is incorporated herein by reference), which discloses a method of covering a thermal sensor on the bottom of a pan with a covering element that is embedded in the pan on the bottom.

As is discussed above, the cooking apparatus 1000 includes a vessel 1002. The vessel 1002 may be any vessel or container that may be used for cooking a food item. For example, the vessel 1002 may be a pot, a pan, a skillet, a sauté pan, a stock pot, a chefs pan, any other vessel (or container) that may be used for cooking a food item, any other vessel (or container) that may hold a liquid, or any combination of the preceding. As is illustrated in FIG. 1A, the vessel 1002 is a pot.

The vessel 1002 includes the bottom 1005. The bottom 1005 may be the base of the vessel 1002, and may support the vessel 1002 (e.g., hold it upright) when it is positioned on a surface. The bottom 1005 may further receive heat from a cooking apparatus (such as a burner) at an external surface 1006, and transfer the heat through the material of the bottom 1005 to an internal surface 1007, where the heat may be further transferred to a food item positioned in the vessel 1002.

The bottom 1005 may have any shape. For example, the external surface 1006 and/or the internal surface 1007 of the bottom 1005 may be shaped as a circle, an oval, a square, a rectangle, a diamond, an irregular shape, any other shape, or any combination of the preceding. The bottom 1005 may further have any size. For example, the bottom 1005 may have any length (or diameter), and any thickness.

As is illustrated, the bottom 1005 may be oriented horizontally when the vessel 1002 is resting on the bottom 1005. In some examples, the bottom 1005 may be oriented substantially horizontally (e.g., horizontal+/−5 degrees) when the vessel 1002 is resting on the bottom 1005. The external surface 1006 and/or internal surface 1007 of the bottom 1005 may have any degree of curvature and/or angle. For example, one (or both) of the external surface 1006 and the internal surface 1007 may be flat, substantially flat (e.g., flat+/−5 degrees), convex, concave, or have any other degree of curvature and/or angle.

The vessel 1002 further includes the sidewall 1010. The sidewall 1010 may surround all or a portion of the bottom 1005, and may extend upward from the bottom 1005 so as to form a fluid retaining interior region 1003 of the vessel 1002. The sidewall 1010 may extend upward from the bottom 1005 at any upward extending angle. For example, the sidewall 1010 may extend upward at 90 degrees, 85 degrees, 80 degrees, 70 degrees, 60 degrees, 45 degrees, 95 degrees, 100 degrees, 110 degrees, 120 degrees, 135 degrees, or any other upward extending angle.

The sidewall 1010 may have an external surface 1011 and an internal surface 1012. The external surface 1011 and/or internal surface 1012 may have any degree of curvature and/or angle. For example, one (or both) of the external surface 1011 and the internal surface 1012 may be flat, substantially flat (e.g., flat+/−5 degrees), convex, concave, or have any other degree of curvature and/or angle. As another example, one (or both) of the external surface 1011 and the internal surface 1012 may be curved, such as by having a degree of curvature of 60 degrees, 55 degrees, 50 degree, 45 degrees, 40 degrees, 35 degrees, 30 degrees, or any other degree of curvature.

The sidewall 1010 may extend upward until it terminates at a rim 1018. The rim 1018 may be positioned at any vertical distance from the bottom 1005. For example, the rim 1018 may be positioned at a vertical distance of 0.5 inches from the bottom 1005, 1 inch from the bottom 1005, 2 inches from the bottom 1005, 3 inches from the bottom 1005, 5 inches from the bottom 1005, 6 inches from the bottom 1005, 8 inches from the bottom 1005, 10 inches from the bottom 1005, 12 inches from the bottom 1005, 24 inches from the bottom 1005, or any other vertical distance from the bottom 1005.

The vessel 1002 may be made of any material(s) that may allow a food item to be cooked using the vessel 1002. For example, the vessel 1002 may be made of aluminum, steel (such as stainless steel and/or carbon steel), copper, clad metal, cast iron, any other metal, pottery materials, non-metallic materials, any other material that may allow a food item to be cooked using the vessel 1002, or any combination of the preceding.

In some examples, the entire vessel 1002 may be made of a single material (e.g., monolithic). For example, the vessel 1002 may be made entirely of copper, or stainless steel. In some examples, only a portion of the vessel 1002 (such as the bottom 1005 of the vessel) may be made of single material (e.g., the vessel may be partially monolithic). In other examples, all or a portion of the vessel 1002 may be made of more than one material. For example, all or a portion of the bottom 1005 may have a clad metal construction. Furthermore, the bottom 1005 may have a magnetic outer layer for induction cooking, or may have an attached magnetic outer layer. As another example, all or a portion of the bottom 1005 may have an impact bonded magnetic layer that may be attached after forming, or may have an attached mesh or perforated metal layer. Such layers may be attached in any manner, such as any manner disclosed in U.S. Pat. No. 5,647,271 (issued to Capelle et al. on Jul. 15, 1997, and which discloses a method of attaching a perforated plate to the bottom of a pan); U.S. Pat. No. 5,345,667 (issued to Coppier on Sep. 13, 1994, and which discloses pressing a perforated plate into a pan bottom in which the base locks into the softer pan bottom); U.S. Pat. No. 5,694,674 (issued to Flammang on Dec. 9, 1997, and which discloses pressing multiples plates together at the bottom of a pan); and EP0928587A1 (by Cheng, published on Jul. 14, 1999, and which discloses a method of attaching an optional magnetic base or cap by impact bonding), all of which are incorporated herein by reference.

The vessel 1002 further includes a channel 1015 that extends through one or more portions of the vessel 1002. As is illustrated, the channel 1015 extends through a portion of the bottom 1005 of the vessel 1002, and further extends upward into and through a portion of the sidewall 1010 of the vessel 1002. The channel 1015 may be any channel, gap, or hole in the material of the vessel 1002 that may allow a thermal sensor (such as thermal sensor 1030) to be positioned within the material of the vessel 1002 in the channel 1015.

The portion of the bottom 1005 through which the channel 1015 extends may be any portion of the bottom 1005 of the vessel 1005. As is illustrated in FIG. 1A, the portion of the bottom 1005 may be a portion that extends from a point in-line with the internal surface 1012 of the sidewall 1010 of the vessel 1002 to approximately a center point (e.g., the center point+1-0.5 inches) of the bottom 1005 of the vessel 1002. In some examples, the portion of the bottom 1005 may be a portion that extends from a point in-line with the internal surface 1012 of the sidewall 1010 of the vessel 1002 to a particular position along the length of the diameter of the bottom 1005, such as to a position that is at approximately 75% of the length of the diameter (e.g., 75% of the length of the diameter+1-5%), 60% of the length of the diameter, 55% of the length of the diameter, 50% of the length of the diameter, 45% of the length of the diameter, 40% of the length of the diameter, or any other position along the length of the diameter of the bottom 1005.

The channel 1015 may also extend upward into and through a portion of the sidewall 1010 of the vessel 1002, where it may end at an opening 1017. The portion of the sidewall 1010 through which the channel 1015 extends may be any portion of the sidewall 1010 of the vessel 1002. As is illustrated in FIG. 1A, the portion of the sidewall 1010 may be a portion that extends from a point (in the bottom 1005) that is in-line with the internal surface 1012 of the sidewall 1010 to a position on sidewall 1010 that is covered by the handle 1020. In some examples, the portion of the sidewall 1010 may be a portion that extends from a point (in the bottom 1005) that is in-line with the internal surface 1012 of the sidewall 1010 to a particular position along the upward extending height of the sidewall 1010, such as to a position that is at approximately 90% of the height of the sidewall 1010 (e.g., 90% of the height of the sidewall+/−5%), 80% of the height of the sidewall 1010, 75% of the height of the sidewall 1010, 60% of the height of the sidewall 1010, 55% of the height of the sidewall 1010, 50% of the height of the sidewall 1010, 45% of the height of the sidewall 1010, 40% of the height of the sidewall 1010, 30% of the height of the sidewall 1010, 25% of the height of the sidewall 1010, or any other position along the height of the sidewall 1010. In some examples, the length of the portion of the sidewall 1010 (through which the cavity 1015 extends) may cause the opening 1017 of the channel 1015 to be positioned closer to the rim 1018 than the bottom 1005. In some examples, this may allow a thermal sensor 1030 positioned in the channel 1015 and extending out of the opening 1017 to extend directly into a handle 1020 (as is seen in FIG. 1A).

The portions of the vessel 1002 through which the cavity 1015 extends may have any material type. For example, the cavity 1015 may only extend through portions of the vessel 1002 that are made of a single material type (e.g., monolithic). In such an example, the cavity 1015 (and the thermal sensor 1030) may not extend through different material types. As another example, the cavity 1015 may extend through portions of the vessel 1002 that are made of a single material type (e.g., monolithic), and may further extend through portions of the vessel 1002 that are not made of a single material type (e.g., metal cladding layers). In such an example, a thermal sensing device 1032 (discussed below) of a thermal sensor 1030 may be positioned in the monolithic portions of the vessel 1002 and cavity 1015, while other portions of the thermal sensor 1030 (e.g., all or a portion of the sensor leads 1034 and/or outer jacket, discussed below) may extend through the non-monolithic portions of the vessel 1002 and cavity 1015. In some examples, the cavity 1015 (and the thermal sensor 1030) may extend in-between inner and outer cladding layers of a vessel 1002, such as through a center or core layer of the vessel 1002 (which is usually the most thermally conductive of metal layers in a metal clad vessel 1002).

The channel 1015 may have an opening 1017 positioned in the external surface 1011 of the sidewall 1010. This opening 1017 may provide access to the channel 1015, allowing a thermal sensor 1030 to be positioned within the channel 1015. The opening 1017 may have any size and/or shape that allows a thermal sensor 1030 to be inserted into the channel 1015 through the opening 1017.

The opening 1017 may remain open (even after the thermal sensor 1030 is positioned within the cavity 1015), or the opening 1017 may be sealed. When sealed, a portion of the thermal sensor 1030 may still extend out of the opening 1017, as is discussed below. The opening 1017 may be sealed in any manner. For example, the opening 1017 may be sealed with high temperature silicones, high temperature fluorosilicones, any other sealing material, or any combination of the preceding. In some examples, the thermal sensor 1030 may include an outer jacket, and the outer jacket may be used to seal the opening 1017. For example, the outer jacket may be a stainless steel thermocouple jacket, a portion of which may be welded to the opening 1017 to seal the opening 1017. In such an example, other portions of the thermal sensor 1030 may extend past the sealed jacket portion, so as to extend into the handle 1020 and couple to the electronic circuit 1040.

The channel 1015 may have any shape that allows a thermal sensor 1030 to be positioned within the channel 1015. For example, the channel 1015 may have a circular cross-section, a square cross-section, an irregular shaped cross-section, any other shaped cross-section, or any combination of the preceding. The channel 1015 may also have any size that allows a thermal sensor 1030 to be positioned with the channel 1015. For example, the channel 1015 may have a cross-sectional diameter of approximately 0.15 inches (e.g., 0.15 inches+1-0.01 inches), 0.10 inches, 0.08 inches, 0.05 inches, or any other sized diameter. The shape and/or size of the channel 1015 may be the same along the entire length of the channel 1015, or it may change along portions of the channel 1015.

In some examples, the length of the channel 1015 may have a curvature. For example, as is illustrated, the channel 1015 may curve as it extends from the bottom 1005 into the sidewall 1010. Also, the channel 1015 may curve as it extends towards the opening 1017. The curvature(s) of the channel 1015 may have a shape and/or radius of curvature that is configured to allow the thermal sensor 1030 to be positioned within the channel 1015. For example, the shape and/or radius of curvature of the channel 1015 may be compatible with the flexibility of the thermal sensor 1030 (including the thermal sensing device 1032, sensor leads 1034, and/or outer jacket, discussed below). This may allow the thermal sensor 1030 to be more easily positioned within the channel 1015 without (or reducing the chance of) crimping, buckling, or otherwise damaging the thermal sensor 1030.

The channel 1015 may be formed in the vessel 1012 in any manner. Examples of the formation of the channel 1015 are discussed in further detail below.

The cooking apparatus 1000 further includes a handle 1020 coupled to the vessel 1002. The handle 1020 may be any structure that allows the vessel 1002 to be picked up, moved, and/or otherwise handled by a user. The handle 1020 may have any size and/or shape that allows the user to pick up, move, or otherwise handle the vessel 1002. For example, the handle 1020 may be shaped as an elongated stick.

The handle 1020 may include a grip portion 1021 and a flange 1022. The grip portion 1021 may be a portion of the handle 1020 that may be gripped or otherwise held by a user when the user is picking up, moving, or otherwise handling the vessel 1002. The grip portion 1021 may be positioned distally from the sidewall 1010 of the vessel 1002, allowing the user to grip the handle 1002 without requiring the user's hand to be positioned too close to the heat radiated by the vessel 1002 and/or heat source (e.g., a burner) that is heating the vessel 1002.

The flange 1022 may be a portion of the handle 1020 that is positioned immediately adjacent to the sidewall 1010 of the vessel 1002 The flange 1022 may allow the handle 1020 to be coupled to the vessel 1002. For example, the flange 1022 may be shaped to receive one or more connectors (e.g., screws) to couple the handle 1020 to the vessel 1002. In such an example, the flange 1022 may be wider than the grip portion 1021 of the handle 1020.

The handle 1020 may be coupled to the vessel 1002 in any manner. For example, as is discussed above, one or more connectors may be used to couple the handle 1020 to the vessel 1002. The connectors may be one or more rivets, studs, screws, an adhesive, any other connector(s) that can couple the handle 1020 to the vessel 1002, or any combination of the preceding. In some examples, the connectors may be inserted into both the flange 1022 and the sidewall 1010, thereby coupling the handle 1020 to the vessel 1002.

The handle 1020 may be coupled to the vessel 1002 (e.g., the side wall 1010 of the vessel 1002) in a location that causes the handle 1020 to be positioned over the opening 1017 of the channel 1015. For example, the handle 1020 may be coupled to the vessel 1002 in a location that causes the shape and/or size of the flange 1022 of the handle 1020 to cover (or be level with) the opening 1017. Such a positioning may allow the thermal sensor 1030 to extend out of the opening 1017 and further extend into the handle 1020, without being exposed to an area outside of the cooking apparatus 1000. In some examples, this may provide further protection to the thermal sensor 1030 from heat.

The cooking apparatus 1000 may further include a thermal sensor 1030 positioned at least partially within the channel 1015 in the vessel 1002. The thermal sensor 1030 may be any structure or device that can sense, detect, measure, and/or determine a temperature associated with the vessel 1002. For example, if the vessel 1002 is being heated to a temperature of 200° F., the thermal sensor 1030 may be able to sense, detect, measure, and/or determine the 200° F. temperature. The thermal sensor 1030 may further be able to transmit one or more signals associated with the temperature. For example, if the thermal sensor 1030 has sensed, detected, measured, and/or otherwise determined a 200° F. temperature, the thermal sensor 1030 may be able to transmit one or more signals associated with the 200° F. temperature to another device, such as the electronic circuit 1040 discussed below. These signals may allow the other device (such as electronic circuit 1040) to determine the temperature.

As illustrated, the thermal sensor 1030 includes a thermal sensing device 1032 and sensor leads 1034. The thermal sensing device 1032 may be a portion of the thermal sensor 1030 that senses, detects, measures, and/or determines the temperature associated with the vessel 1002. The thermal sensing device 1032 may be any device or component that can sense, detect, measure, and/or determine the temperature. For example, the thermal sensing device 1032 may be a thermocouple, a thermistor, a thermopile, a Surface Acoustic Waves sensor, a Bulk Acoustic Waves sensor, any other device that can sense, detect, measure, and/or determine the temperature, or any combination of the preceding. The thermal sensing device 1032 may sense, detect, measure, and/or determine the temperature at a single point on the thermal sensing device 1032, or at multiple points on the thermal sensing device 1032 (e.g., the temperature at the tip of the thermal sensing device 1032, the temperature at the base of the thermal sensing device 1032, the temperature at a mid-point section of the thermal sensing device 1032, etc.).

The thermal sensor 1030 may further include sensor leads 1034 communicatively coupled to the thermal sensing device 1032. The sensor leads 1034 may be any structure that allows one or more signals to be transmitted to and/or from the thermal sensing device 1032. For example, the sensor leads 1034 may be leads, wires, a communication strip, any other structure that allows one or more signals to be transmitted to and/or from the thermal sensing device 1032, or any combination of the preceding. Additionally the sensor leads 1034 may be a single lead, or more than one lead, such as two leads, three leads, or any other number of leads. As is illustrated, the sensor leads 1034 may be communicatively coupled to the thermal sensing device 1032, and may further be communicatively coupled to another device, such as electronic circuit 1040, discussed below. In such an example, sensor leads 1034 may allow one or more signals to be transmitted in-between the thermal sensing device 1032 and the electronic circuit 1040.

In some examples, the thermal sensor 1030 may further include an outer jacket (not shown) that may enclose the thermal sensing device 1032 and all or a portion of the sensor leads 1034. The outer jacket may be made of any material. For example, the outer jacket may be a pliable stainless steel tube that encloses the thermal sensing device 1032 and all or a portion of the sensor leads 1034. The outer jacket may also have any size which allows the thermal sensor 1030 to be positioned within the cavity 1015. For example, if the cavity has a circular cross section with a diameter of 0.08 inches, the outer jacket may have an external diameter of 0.05 inches (or any other diameter less than 0.08 inches).

As is discussed above, the thermal sensor 1030 may be positioned within the channel 1015. Such a positioning may cause the thermal sensor 1030 to extend through a portion of the bottom 1005 of the vessel 1002 and further extend upward into and through a portion of the sidewall 1010. The thermal sensor 1030 may further extend out of the opening 1017, extend into the handle 1020 (such as extend into the flange 1022 and further extend into the grip portion 1021), and couple to another device, such as the electronic circuit 1040. This positioning of the thermal sensor 1030 may allow the thermal sensor 1030 to more accurately sense the temperature associated with the food, while still allowing the thermal sensor 1030 to provide the detected temperature to the electronic circuit 1040 without subjecting the thermal sensor 1030 to heat outside the vessel 1002, for example.

The thermal sensor 1030 (and its components, such as the thermal sensing device 1032 and the sensor leads 1034) may be positioned at any location within the channel 1015. For example, as is illustrated in FIG. 1A, the thermal sensing device 1032 may be positioned in the bottom 1005 of the vessel 1002, and the sensor leads 1034 may be coupled to the thermal sensing device 1032 and may extend from the bottom 1005 of the vessel 1002 upward into the sidewall 1010 of the vessel 1002, and may further extend into the handle 1020. When positioned within the bottom 1005, the thermal sensing device 1032 may be positioned at any location within the cavity 1015 in the bottom 1005 of the vessel 1002. For example, the thermal sensing device 1032 may be positioned at a location that is at approximately the center point (e.g., the center point+/−0.5 inches) of the bottom 1005 of the vessel 1002, or a location that is at approximately a position located halfway between the center point of the bottom 1005 and the sidewall 1010. In other examples, the thermal sensing device 1032 may be positioned at a location that is at approximately a position located at 45% of the length of the diameter of the bottom 1005, 40% of the length of the diameter of the bottom 1005, 35% of the length of the diameter of the bottom 1005, or any other position along the length of the diameter of the bottom 1005.

In some examples, the thermal sensing device 1032 may be positioned in the bottom 1005 of the vessel 1002 (in the channel 1015), but the thermal sensing device 1032 may also extend from the bottom 1005 upward into and through a first area of the sidewall 1010. Additionally, the sensor leads 1034 may be coupled to the thermal sensing device 1032 at a location in the first area of the sidewall 1010 (in the cavity 1015), and then the sensor leads 1034 may extend from the first area of the sidewall 1010 into and through a second area of the sidewall 1010, and further extend out of the cavity 1015 and into the handle 1020.

Figure 5A:
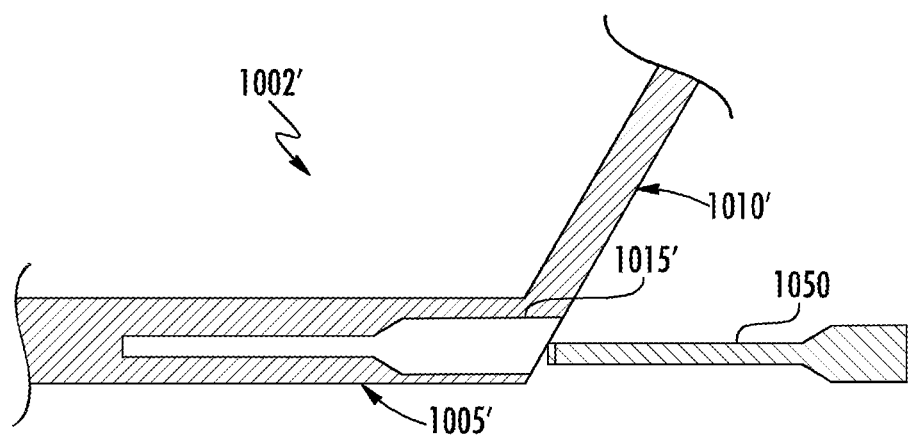
FIGS. 5A-5C are cross-sectional schematic illustrations of another example of the formation of a channel.
Figure 5B:
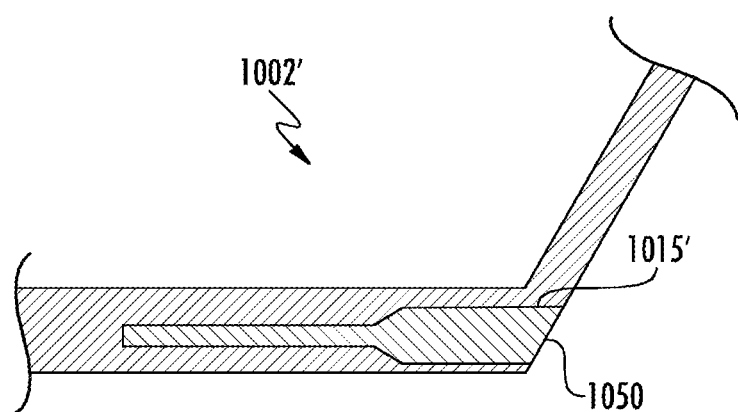
Figure 5C:
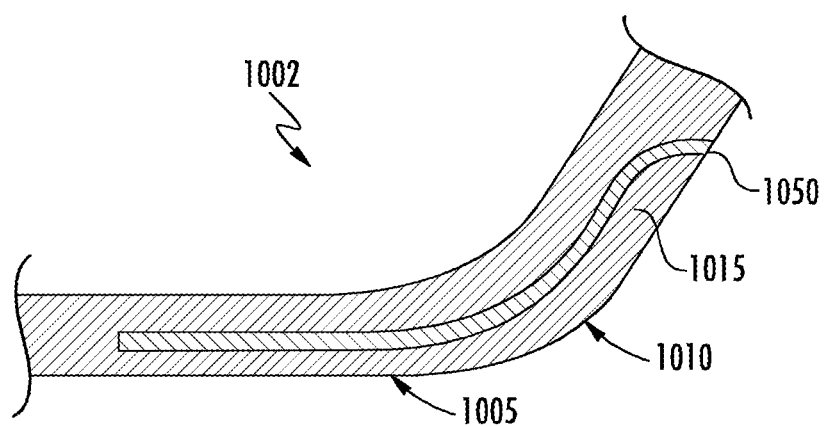

In other examples, the thermal sensor 1030 may not be positioned in the bottom 1005 of the vessel 1002 at all. Instead, a heat pipe (an example of which is illustrated in FIGS. 5A-5C) may be positioned in the bottom 1005 of the vessel 1002 (in the channel 1015), and the heat pipe may extend from the bottom 1005 of the vessel 1002 upward into and through the sidewall 1010. In addition to the heat pipe, the cooking apparatus 1000 may further include the thermal sensor 1030 positioned in the cavity 1015 in the sidewall 1010, where it may be coupled to the heat pipe within the cavity 1015 in the sidewall 1010. As such, the thermal sensor 1030 (which may include a thermal sensing device 1032 and sensor leads 1034) may sense, detect, measure, and/or determine the temperature transferred to it from the bottom 1005 by the heat pipe. The heat pipe may be any structure that may transfer heat. For example, the heat pipe may be a metal heat pipe. The metal heat pipe may be made of any metal, such as copper or silver. Furthermore, the metal heat pipe may be a solid metal heat pipe.

As is illustrated in FIG. 1A, the cooking apparatus 1000 further includes an electronic circuit 1040 positioned on or in the handle 1020. The electronic circuit 1040 may be any device that may receive signals from the thermal sensor 1030 and that may further determine a temperature associated with the vessel 1002 based on the signals. For example, the electronic circuit 1040 may be a processor, microprocessor, controller/transmitter, any other electronic circuit that may receive signals and determine a temperature associated with the vessel 1002 based on the signals, or any combination of the preceding. The temperature associated with the vessel 1002 may be any temperature that is associated with the vessel 1002, such as, for example, the temperature to which the vessel 1002 is heated, the temperature to which a portion of the vessel 1002 (e.g., the bottom 1005) is heated, the food exposure temperature (e.g., the temperature that a food item is exposed to as a result of being cooked in the vessel 1002), any other temperature associated with the vessel 1002, or any combination of the preceding.

The electronic circuit 1040 may determine the temperature associated the vessel 1002 in any manner. For example, the electronic circuit 1040 may determine the temperature (e.g., 200° F.) by receiving the actual temperature (e.g., 200° F.) from the thermal sensor 1030. In such an example, the thermal sensor 1030 may have calculated the temperature, and sent a data signal to the electronic circuit 1040 that includes the calculated temperature. As another example, the electronic circuit 1040 may receive data other than the temperature (such as a measurement of resistance) from the thermal sensor 1030, and the electronic circuit 1040 may use that data to determine the actual temperature. In such an example, the electronic circuit 1040 may receive from the thermal sensor 1030 any type of data that may be used to determine, measure, and/or calculate the temperature, such as a measurement of resistance or a measurement of voltage.

In some examples, the electronic circuit 1040 may determine the temperature associated with the vessel 1002 based on signals from multiple thermal sensors 1030. For example, the cooking apparatus 1000 may include multiple thermal sensors 1030 positioned at multiple locations on or in the vessel 1002. In such an example, the temperature associated with the vessel 1002 may be an average of the temperature measurements received from all of the thermal sensors 1030. Alternatively, the electronic circuit 1040 may determine a temperature associated with the vessel 1002 for each of the thermal sensors 1030 (e.g., a first temperature for a first thermal sensor, a second temperature for a second thermal sensor, etc.).

Figure 1B:
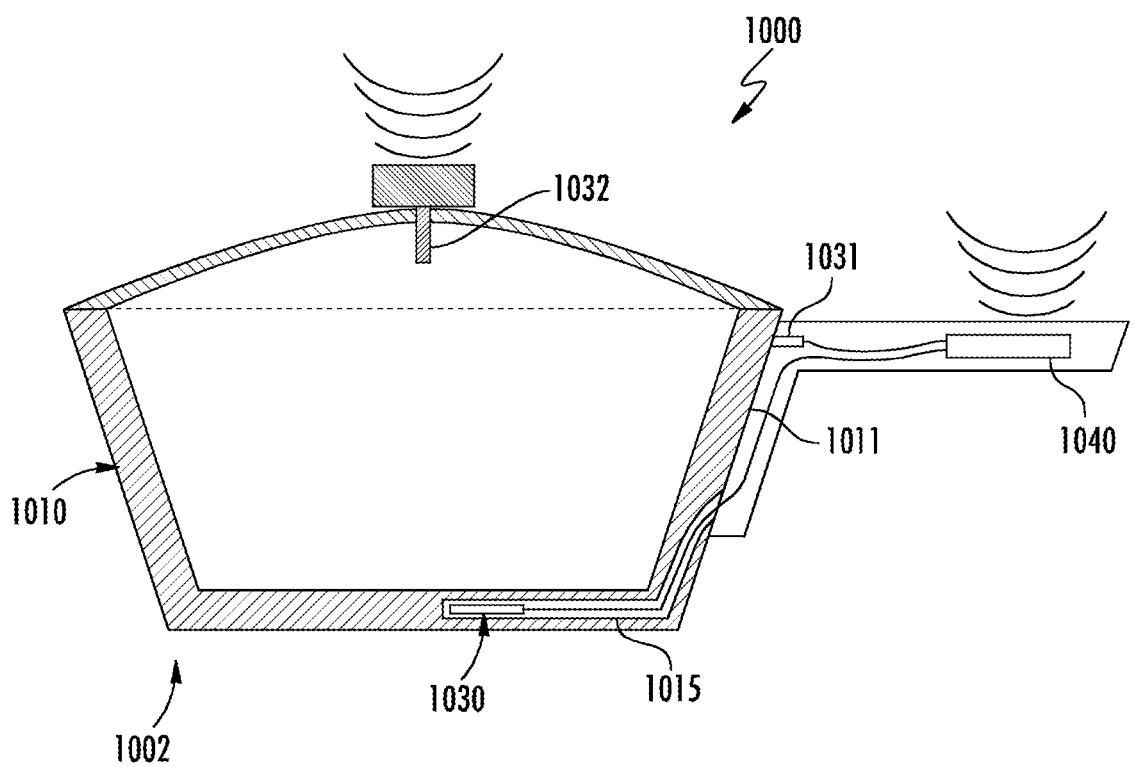
FIG. 1B is a cross-sectional view of the cooking apparatus of FIG. 1A having multiple thermal sensors.
Figure 1C:
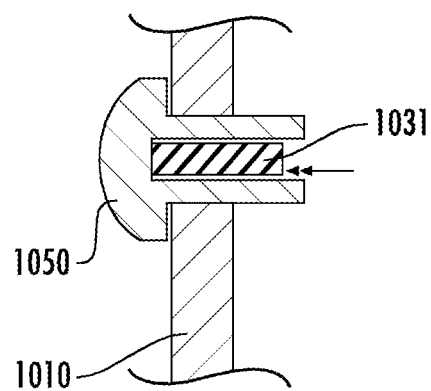
FIG. 1C is an enlarged cross-sectional view of a portion the cooking apparatus of FIG. 1B having a thermal sensor positioned within a sidewall.

When the cooking apparatus 1000 includes multiple thermal sensors 1030, the thermal sensors 1030 may be positioned at any location on or in the vessel 1002. For example, two or more thermal sensors 1030 may be positioned in the same cavity 1015, but at different locations in the cavity 1015 (such as two thermal sensors 1030 positioned in different locations within the same bottom portion of the cavity 1015, or a thermal sensor 1030 positioned in the bottom portion of the cavity 1015 and also a thermal sensor 1030 positioned in the sidewall portion of the cavity 1015). As another example, one or more thermal sensors 1030 may be positioned in cavity 1015, and one or more additional thermal sensors 1030 may be positioned at other locations on or in the vessel 1002 (such as in the lid of the vessel 1002, on the sidewall 1010 of the vessel 1002, in an additional cavity 1015 (or cavities 1015) in the vessel 1002, etc.). Examples of different positioning of thermal sensors are illustrated in FIGS. 1B and 1C.

The electronic circuit 1040 may further transmit the temperature for display. For example, the electronic circuit 1040 may include a display (such as a liquid crystal display positioned on or in the handle 1020) that may receive and display the determined temperature. This may allow the user to keep track of the current temperature by merely looking at the display of the electronic circuit 1040. As another example, the electronic circuit 1040 may transmit the temperature for display to another device, such as a user's smart phone, a smart cooking system where the cooking process is controlled based on a series of stages and/or temperature measurements (such as the cooking system disclosed in U.S. Patent Application Publication No. 2016/0051078 entitled "Automated Cooking Control Via Enhanced Cooking Equipment," published Feb. 25, 2016, and which is incorporated herein by reference), any other device that may utilize the temperature, or any combination of the preceding.

As is discussed above, the electronic circuit 1040 may be positioned on or in the handle 1020. In order for the electronic circuit 1040 to be positioned in the handle 1020, the handle 1020 may be hollow, or the handle 1020 may include a cavity in which the electronic circuit 1040 may be positioned. The hollow area in the handle 1020 may be sized to allow the electronic circuit 1040 to be positioned within the handle 1020, along with one or more batteries or other power source for the electronic circuit 1040. Additionally, the handle 1020 may further include a channel (or other hollow portion) through which the thermal sensor 1030 may extend into the handle 1020 in order to be coupled with the electronic circuit 1040.

When the electronic circuit 1040 is positioned on the handle 1020, the electronic circuit 1040 may be positioned at any location on the handle 1020. For example, the electronic circuit 1040 may be positioned on the outside top surface of the grip portion 1021, the outside side surface of the grip portion 1021, the outside surface of the flange 1022, or any other location on the handle 1020.

FIG. 1B is a cross-sectional view of the cooking apparatus of FIG. 1A having multiple thermal sensors. As is illustrated, the vessel 1002 of the cooking apparatus 1000 includes the thermal sensor 1030 positioned within the cavity 1015 of the vessel 1002, a second thermal sensor 1031 positioned to be in contact with (or within) the sidewall 1010 of the vessel 1002, and a third thermal sensor 1032 positioned to be in contact with (or within) a lid of the vessel 1002. Example details regarding the thermal sensor 1030 and the cavity 1015 of the vessel 1002 are discussed above with regard to FIG. 1A.

Similar to the thermal sensor 1030 discussed above, the second thermal sensor 1031 and the third thermal sensor 1032 may each be any structure or device that can sense, detect, measure, and/or determine a temperature associated with the vessel 1002, and that further can transmit one or more signals associated with the temperature. Examples of each of the second thermal sensor 1031 and the third thermal sensor 1032 include a thermocouple, a thermistor, a thermopile, a Surface Acoustic Waves sensor, a Bulk Acoustic Waves sensor, any other device that can sense, detect, measure, and/or determine the temperature, or any combination of the preceding.

The second thermal sensor 1031 may be positioned at any location that allows it to be in contact with (or within) the sidewall 1010 of the vessel 1002. For example, as is illustrated, the second thermal sensor 1031 may be positioned within the handle 1020 (or the flange 1022 of the handle 1020), and may be further coupled to the external surface 1011 of the sidewall 1010. The second thermal sensor 1031 may be coupled to the external surface 1011 of the sidewall 1010 in any manner, such as by a spring or any other resilient member.

The second thermal sensor 1031 may sense, detect, measure, and/or determine a thermal temperature associated with the sidewall 1010 of the vessel 1002. Additionally, the second thermal sensor 1031 may communicate that temperature to the electronic circuit 1040 in any manner. For example, similar to the thermal sensor 1030, the second thermal sensor 1031 may include sensor leads that transmit signals in-between the second thermal sensor 1031 and the electronic circuit 1040.

The third thermal sensor 1032 may be positioned at any location that allows it to be in contact with (or within) the lid of the vessel 1002. For example, as is illustrated, the third thermal sensor 1032 may be positioned on an internal surface of the lid. The third thermal sensor 1032 may be coupled to the internal surface of the lid in any manner, such as by a spring or by being coupled to a knob positioned in the lid.

The third thermal sensor 1032 may sense, detect, measure, and/or determine a thermal temperature inside of the vessel 1002. Additionally, the third thermal sensor 1032 may communicate that temperature to the electronic circuit 1040 in any manner. For example, the third thermal sensor 1032 may wirelessly (e.g., Bluetooth, Wi-Fi, etc.) transmit the temperature to the electronic circuit 1040.

In some examples, each of the second thermal sensor 1031 and the third thermal sensor 1032 may be permanently coupled to their positioning. In other examples, each of the second thermal sensor 1031 and the third thermal sensor 1032 may be removably coupled to their positioning on or in the vessel 1002. In such examples, the thermal sensors 1031, 1032 may be repositioned in different positions on or in the vessel 1002, or may be removed entirely from the vessel 1002.

As is discussed above, the electronic circuit 1040 may determine the temperature associated with the vessel 1002, and may further transmit the temperature for display. The temperature associated with the vessel 1002 may be an average of the temperature measurements received from all of the thermal sensors 1030, 1031, and 1032. Alternatively, the electronic circuit 1040 may determine a temperature associated with the vessel 1002 for each of the thermal sensors 1030 (e.g., a first temperature for thermal sensor 1030, a second temperature for the second thermal sensor 1031, and a third temperature for the third thermal sensor 1032), and may transmit each of these determined temperatures for display. In another example, a user may select (and/or change) whether the temperature associated with the vessel 1002 is an average of all of the thermal sensors, or an individual temperature for each of the thermal sensors.

FIG. 1C is an enlarged cross-sectional view of a portion the cooking apparatus of FIG. 1B having a thermal sensor positioned within a sidewall. As is illustrated, the second thermal sensor 1031 is positioned within a rivet 1050 in the sidewall 1010 of the vessel 1002 of the cooking apparatus 1000. Example details regarding the second thermal sensor 1031 and the vessel 1002 are discussed above with regard to FIGS. 1A and 1B.

The sidewall 1010 of the vessel 1002 may have a hole into which the rivet 1050 may be placed. The rivet 1050 may be a false rivet, in that the rivet 1050 may not be used to couple any other structure to the vessel 1002. In such an example, the false rivet 1050 may only be used to position the second thermal sensor 1031 within the sidewall 1010 of the vessel 1002. Alternatively, the rivet 1050 could be used to couple another structure to the vessel 1002. For example, the rivet 1050 could be one of the connectors used to couple the handle 1020 to the vessel 1002. In such an example, the rivet 1050 may couple the handle 1020 to the vessel 1002, and may also be used to position the second thermal sensor 1031 within the sidewall 1010 of the vessel 1002.

The rivet 1050 may be positioned at any location in the sidewall 1010. For example, the rivet 1050 may be positioned in a location that causes the rivet 1050 to be located within the handle 1020 (or the flange 1022 of the handle 1020). As such, the rivet 1050 may not be viewable from the outside of the vessel 1002.

When positioned within the rivet 1050, the second thermal sensor 1031 may communicate the temperature to the electronic circuit 1040 in any manner. For example, the second thermal sensor 1031 may include sensor leads that transmit signals in-between the second thermal sensor 1031 and the electronic circuit 1040. As another example, the second thermal sensor 1031 may wirelessly (e.g., Bluetooth, Wi-Fi, etc.) transmit the temperature to the electronic circuit 1040.

Modifications, additions, and/or substitutions may be made to the cooking apparatus 1000 of FIGS. 1A-1C without departing from the scope of the specification. For example, the cooking apparatus 1000 may include any number of thermal sensors 1030, 1031, and 1032, and each of the thermal sensors 1030, 1031, and 1032 may be positioned at any location in or on the cooking apparatus 1000.

Figure 2:
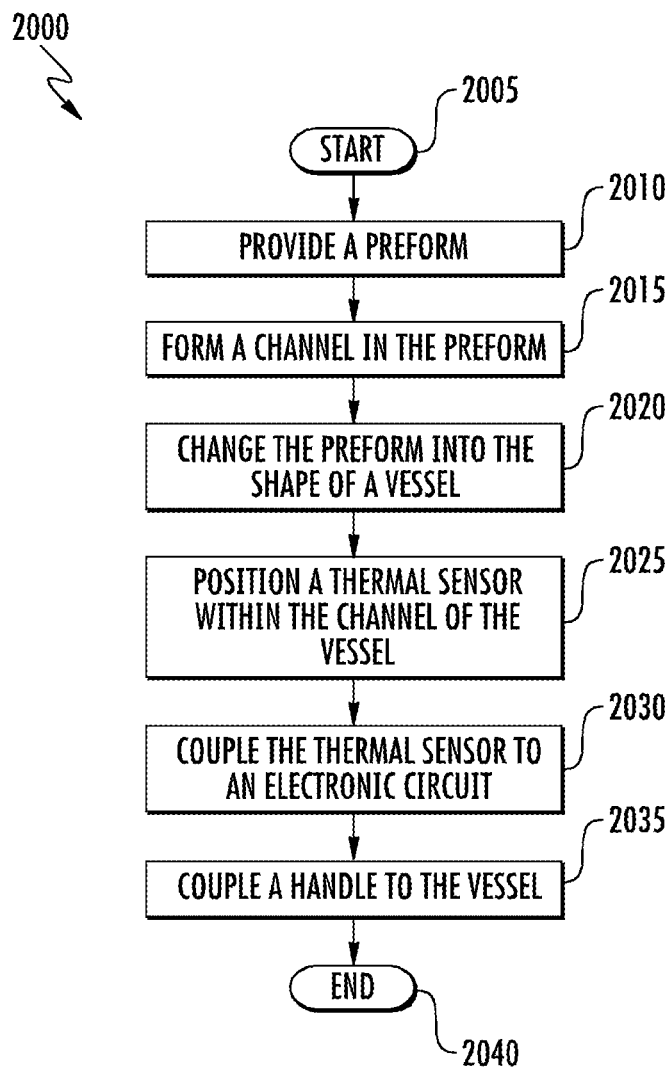
FIG. 2 illustrates a method for forming a cooking apparatus.

FIG. 2 illustrates a method for forming a cooking apparatus. Method 2000 of FIG. 2 may be used to form any suitable cooking apparatus, such as cooking apparatuses 1000 discussed above with regard to FIGS. 1A-1C. One or more of the steps (such as all of the steps) of method 2000 may be performed by a manufacturer of a cooking apparatus, a re-seller of a cooking apparatus, a shipper of a cooking apparatus, and/or a user of a cooking apparatus. Additionally, one or more of the steps of method 2000 may be performed by different entities. Also, one or more steps of FIG. 2 may coincide with the illustrations of FIGS. 3A-3D, which are cross-sectional schematic illustrations of an example of the formation of a cooking apparatus.

Figure 3A:
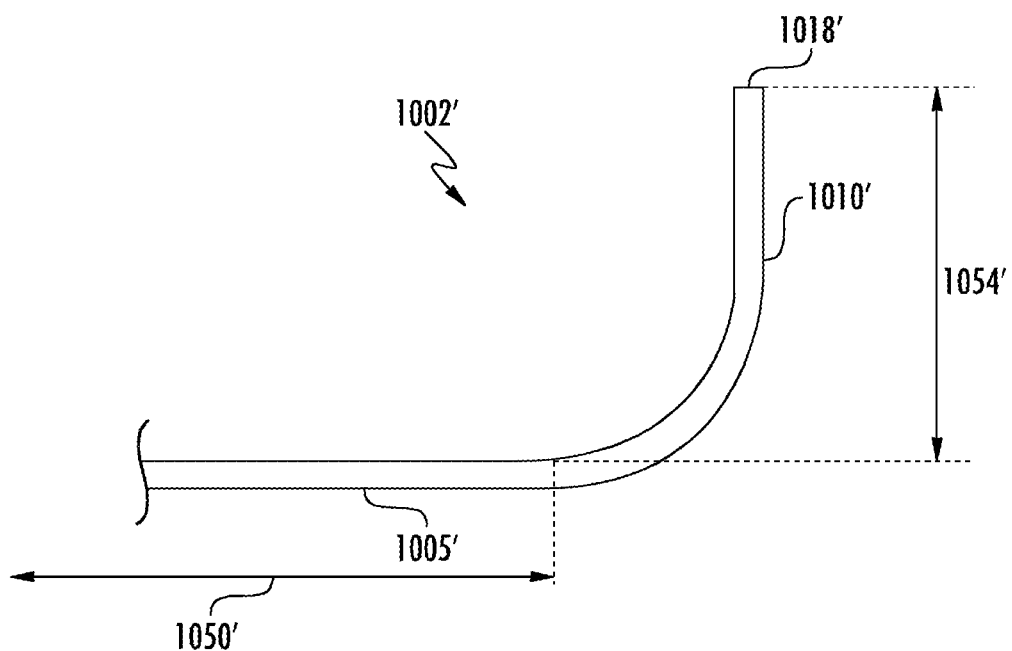
FIGS. 3A-3D are cross-sectional schematic illustrations of an example of the formation of a cooking apparatus.

The method starts at step 2005. At step 2010, a preform is provided. The preform may be a shallow vessel that is used to form the vessel of the cooking apparatus (such as to form the vessel 1002 of the cooking apparatus 1000). An example of the preform is illustrated in FIG. 3A, as preform 1002'. The preform 1002' may include a bottom 1005' that has a first diameter 1050'. The preform 1002' may further have a sidewall 1010' that surrounds the bottom 1005' and extends upward from the bottom 1005' so as to form a fluid retaining interior region of the preform 1002'. The sidewall 1010' may terminate at a rim 1018' which is positioned at a first height 1054' from the bottom 1005'.

The preform may be provided in any manner. For example, the preform may be formed, created, purchased, shipped, acquired, received, provided in any other manner, or any combination of the preceding. In an example where the preform is formed, the preform may be formed by changing a planar stock member (such as a disk) into the preform. In such an example, the preform may be formed by any forming operation, such as deep drawing. The preform may be monolithic or partially monolithic. Furthermore, the preform may be made of copper, stainless steel, clad metal, or any other material that may be used to form a vessel 1002, as is discussed above.

At step 2015, a channel is formed in the preform. For example, a channel 1015' may be formed laterally in the bottom 1005' of the preform 1002'. The channel 1015' may be formed in any manner. For example, the channel 1015' may be formed by electric discharge machining (EDM), mechanical drilling, waterjet cutting, laser ablation, chemical etching, any other method of forming a channel, or any combination of the preceding. Examples of the formation of a channel are disclosed in U.S. Patent Application Publication No. 2016/0051078 entitled "Automated Cooking Control Via Enhanced Cooking Equipment," published Feb. 25, 2016, and which is incorporated herein by reference. When formed, the channel 1015' may extend through a portion of the bottom 1005', but the channel 1015' may not extend through any portion of the sidewall 1010'. Additionally, the channel 1015' may have an opening 1017' in the external surface 1006' of the bottom 1005' of the preform 1002'.

Figure 4A:
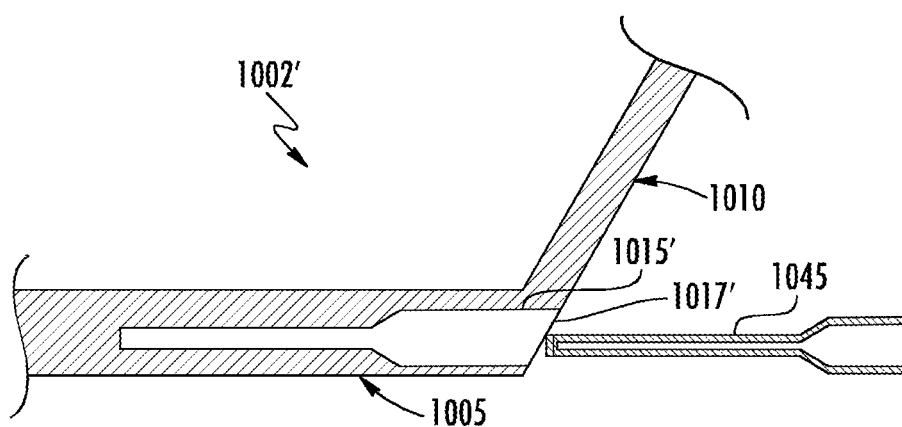
FIGS. 4A-4C are cross-sectional schematic illustrations of an example of the formation of a channel.

The channel 1015' may be formed to any length through the bottom 1005'. Furthermore the channel 1015' may have any shape and/or size. For example the channel 1015' may have a circular cross section with a diameter of 0.08 inches. The shape and/or size of the channel 1015' may be uniform throughout its length through the bottom 1005'. Alternatively, the shape and/or size of the channel 1015 may change (e.g., be tapered) along its length through the bottom 1005', as is seen in FIGS. 4A and 5A, which illustrate examples of the formation of channels.

At step 2020, the preform is changed into the shape of a vessel. In some examples, the preform may be changed into the shape of a deeper vessel, with a narrower base. Additionally, the change in shape may also cause the channel to deform in shape. In some examples, the deformed channel may extend through the bottom of the vessel, and further extend upward into and through the sidewall of the vessel. This deformation may cause the opening in the channel to be positioned in the sidewall of the vessel (as opposed to the base of the preform).

The preform may be changed into the shape of the vessel in any manner. For example, the preform may be changed into the shape of the vessel by deep drawing the preform into the shape of the vessel. An example of such deep drawing is described in U.S. Pat. No. 7,761,971, issued Jul. 27, 2010 to Cheng, which is incorporated herein by reference.

The preform may be changed into the shape of any type of vessel. For example, the preform may be changed into the shape of vessel 1002 of FIGS. 1A-1C. An example of the vessel into which the preform is changed is illustrated in FIG. 3C, as vessel 1002. As is illustrated in FIG. 3C, the vessel 1002 may include a bottom 1005 that has a second diameter 1050 that is less than the first diameter 1050' of the preform 1002'. For example, if the preform 1002' had a first diameter 1050' of 12 inches, the vessel 1002 may have a second diameter 1050 of 10 inches. The change in diameter from the preform 1002' to the vessel 1002 may be the result of changing the shape of the preform 1002' into the shape of the vessel 1002. For example, when the shape of the preform 1002' is changed into the shape of the vessel 1002, a portion of the bottom 1005' of the preform 1002' may be changed by the step 2020 into a portion of the sidewall 1010 of the vessel 1002. As an example of this, the shape change may cause a portion of the bottom 1005' to deform in shape (e.g., bend upward), causing it to now form a portion of the sidewall 1010 of the vessel 1002. As a result of the shape change, the second diameter 1050 of the bottom 1005 of the vessel 1002 may be smaller in comparison to the first diameter 1050' of the bottom 1005' of the preform 1002'. An example of the difference in shape between the preform 1002' and the vessel 1002 is illustrated in FIG. 3D.

The vessel 1002 may further have a sidewall 1010 that surrounds the bottom 1005 and extends upward from the bottom 1005 so as to form a fluid retaining interior region of the vessel 1002. The sidewall 1010 may terminate at a rim 1018 which is positioned at a second height 1054 from the bottom 1005. The second height 1054 of the vessel 1002 may be greater than the first height 1054' of the preform 1002'. For example, if the preform 1002' had a first height 1054' of 3 inches, the vessel 1002 may have a second height 1054 of 5 inches.

The change in height from the preform 1002' to the vessel 1002 may be the result of changing the shape of the preform 1002' into the shape of the vessel 1002. For example, when the shape of the preform 1002' is changed into the shape of the vessel 1002, a portion of the bottom 1005' of the preform 1002' may be changed by the step 2020 into a portion of the sidewall 1010 of the vessel 1002. As an example of this, the shape change may cause a portion of the bottom 1005' to deform in shape (e.g., bend upward), causing it to now form a portion of the sidewall 1010 of the vessel 1002. As a result of the shape change, the second height 1054 of the sidewall 1010 of the vessel 1002 may be larger in comparison to the second height 1054' of the sidewall 1010' of the preform 1002'. An example of the difference in shape between the preform 1002' and the vessel 1002 is illustrated in FIG. 3D.

The second height 1054 of the vessel 1002 may only be a temporary height. For example, after the second height 1054 is formed (by step 2020), the second height 1054 may be trimmed (or otherwise lowered) so as to form a less deep vessel 1002.

When the shape of the preform 1002' is changed into the shape of the vessel 1002, the shape of the channel may also change. For example, the channel may change (e.g., deform) from the shape of the channel 1015' of FIG. 3B into the shape of the channel 1015 of FIG. 3C. As is illustrated, this may result in the channel changing from a lateral shape (FIG. 3B) to a curved shape (FIG. 3C). Once changed, the channel 1015 may extend through a portion of the bottom 1005 of the vessel 1002, and the channel 1015 may also extend upward into and through a portion of the sidewall 1010 of the vessel 1002. Furthermore, the channel 1015 may have an opening 1017 positioned in an external surface 1011 of the sidewall 1010 of the vessel 1002.

In addition to changing the preform into the shape of a vessel, in some examples, step 2020 may further include attaching an induction base to the bottom of the vessel. For example, a magnetic outer layer for induction cooking may be attached to the bottom of the vessel. The induction base may be attached in any manner, such as, for example, impact bonding, soldering, brazing, any other manner of attaching an induction base, or any combination of the preceding.

At step 2025 a thermal sensor is positioned within the channel of the vessel. The thermal sensor may be thermal sensor 1030 (which may include the thermal sensing device 1032 and the sensor leads 1034, as is discussed above) or any other thermal sensor. The thermal sensor may be positioned in any manner within the channel of the vessel. For example, the thermal sensor may be inserted into the opening 1017 of the channel 1015, and may be routed into the channel 1015 until the thermal sensor reaches a particular position within the channel 1015 (e.g., until the tip of the thermal sensing device 1032 reaches the end of the channel 1015 at the bottom 1005 of the vessel 1002). The thermal sensor may be positioned in any location within the channel of the vessel. For example, the thermal sensor may be positioned so that the thermal sensor extends through the bottom of the vessel, further extends upward into and through the sidewall of the vessel, and further extends out of the opening of the channel. Examples of the positioning of the thermal sensor are discussed above with regard to FIGS. 1A-1C.

At step 2030, the thermal sensor is coupled to an electronic circuit. The electronic circuit may be electronic circuit 1040 or any other electronic circuit. The thermal sensor may be coupled to the electronic circuit in any manner. For example, the electronic circuit may be positioned on or in a handle that is to be coupled to the vessel. In such an example, the thermal sensor (such as the sensor leads 1034 of thermal sensor 1030) may be routed through the handle (such as through a hollow portion of the handle 1020) until the thermal sensor reaches the electronic circuit positioned on or in the handle. Then the thermal sensor may be electrically connected to the electronic circuit, such as by attaching the sensor leads 1034 of the thermal sensor 1030 to an input lead of the electronic circuit 1040.

At step 2032, the handle is coupled to the vessel. The handle may be handle 1020 or any other handle. The handle may be coupled to the vessel in any manner. For example, the handle may be coupled to the sidewall of the vessel using one or more connectors (e.g., screws). In some examples, the handle may be coupled to the sidewall of the vessel by inserting one or more connectors through a flange of the handle into the sidewall of the vessel. Additionally, the handle may be coupled to the vessel at any position on the sidewall. As is illustrated in FIGS. 1A-1C, the handle 1020 may be coupled to the sidewall 1010 of the vessel 1002 so that the handle 1020 (or the flange 1022 of the handle 1020) covers the opening 1017 of the cavity 1015 in the vessel 1002. Once the handle is coupled to the vessel, the method 2000 may move to step 2040, where method 2000 ends.

Modifications, additions, or omissions may be made to method 2000. For example, the method 2000 may not include one or more of the steps (e.g., some steps may be optional). For example, although method 2000 has been described above as including step 2015 where a channel is formed in the preform, in some examples, the preform may be provided with the channel already formed in the preform. Additionally, the steps of method 2000 may be performed in parallel or in any suitable order.

Figure 4B:
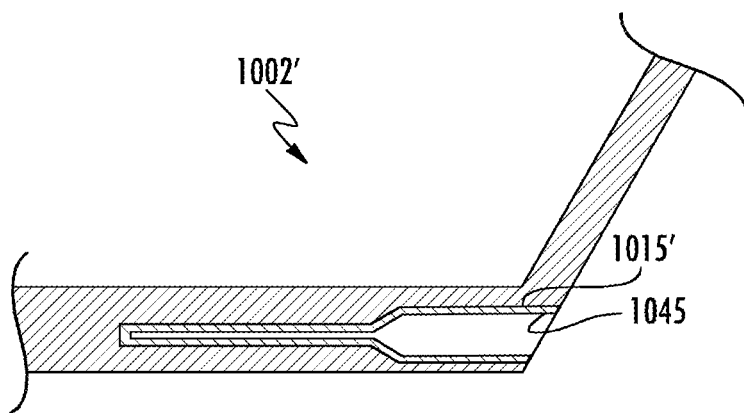
Figure 4C:
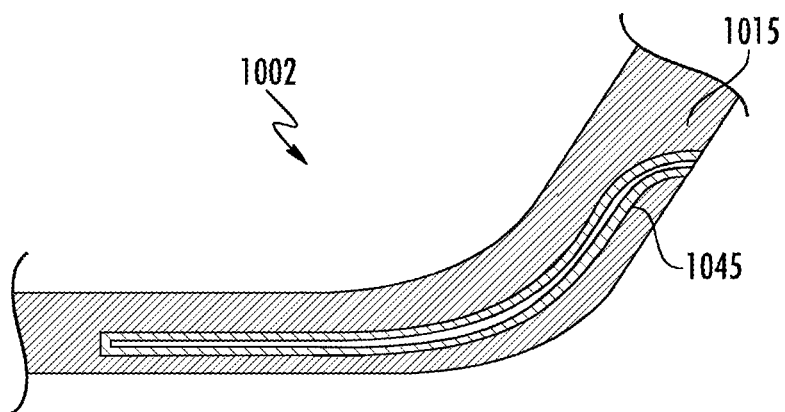

FIGS. 4A-4C are cross-sectional schematic illustrations of an example of the formation of a channel. This illustrated formation of the channel may be performed using steps 2015 and 2020 of method 2000 of FIG. 2.

Figure 3B:
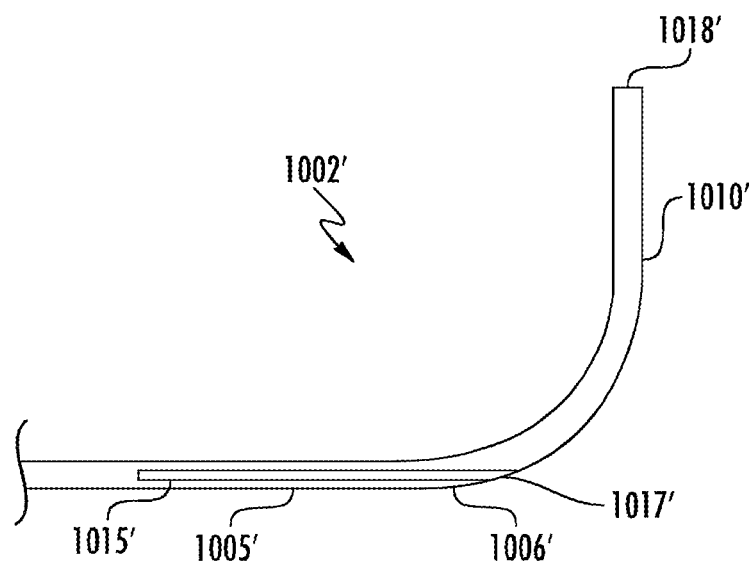
Figure 3C:
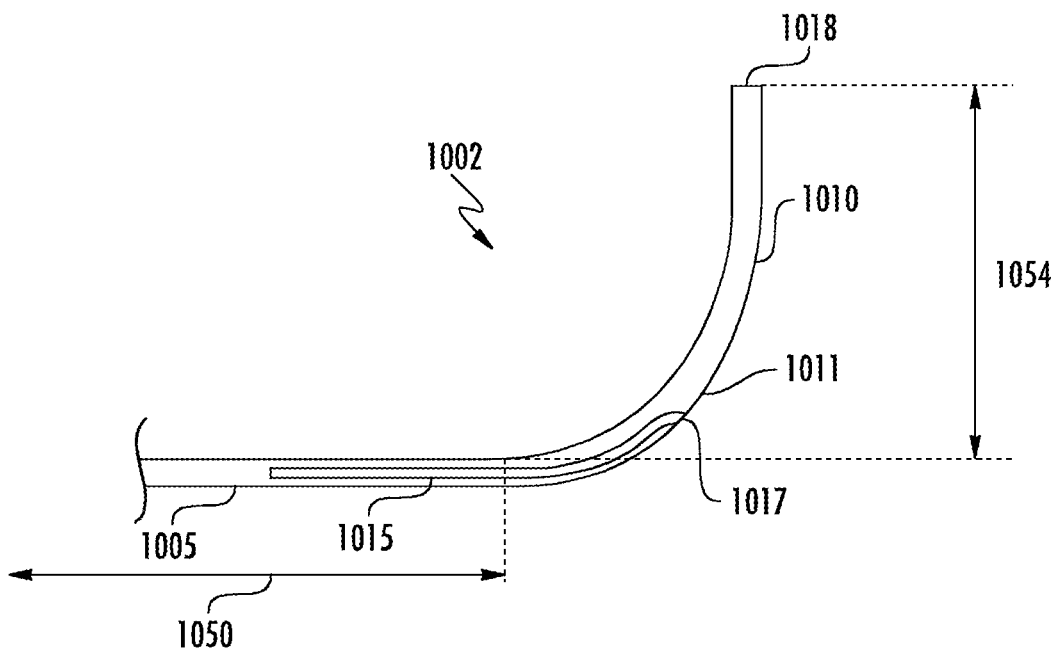
Figure 3D:
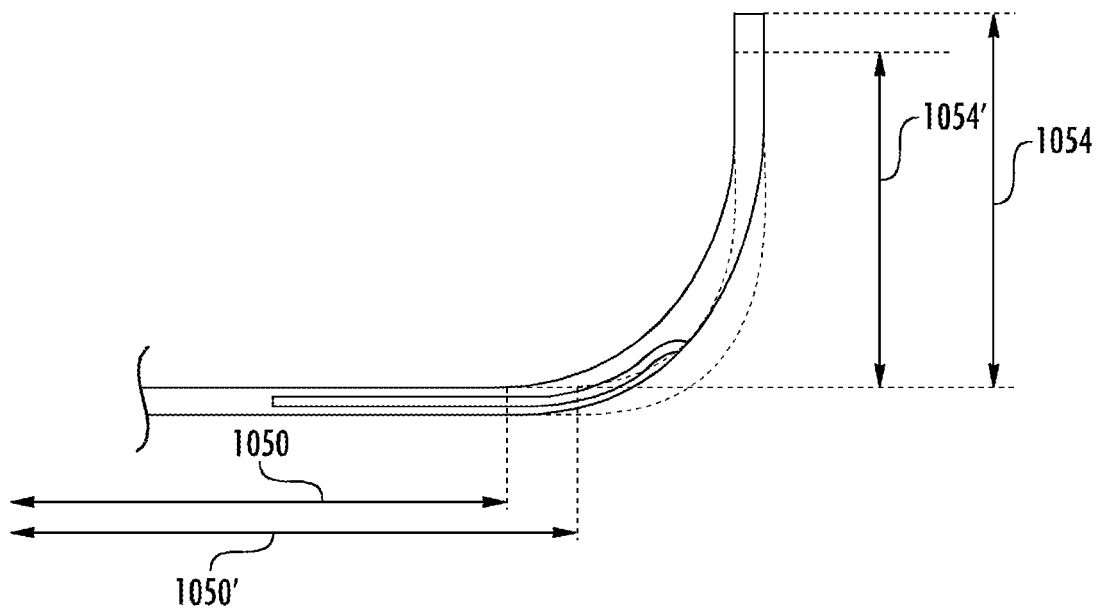

As is illustrated in FIG. 4A, the formed channel 1015' (e.g., formed at step 2015) of the preform 1002' may be tapered along the its length (as opposed to the uniform shape shown in FIG. 3B). This tapered shape may be configured to accommodate the deformation of the channel 1015' that may occur when the preform is changed into the shape of a vessel (step 2020 of FIG. 2). For example, the tapered channel 1015' in the preform 1002' may deform into a uniform channel 1015 in the vessel 1002.

In some examples, a hollow pipe 1045 may be further inserted into the channel 1015', prior to step 2020 where the preform is changed into the shape of a vessel. The hollow pipe 1045 (or other hollow structure) may have a non-uniform diameter. Additionally, it may be welded to preform 1002', such as welded to the bottom 1005' at the opening 1017'. An example of the hollow pipe 1045 inserted into the channel 1015' is illustrated in FIG. 4B.

In some examples, when the preform is subsequently changed into the shape of a vessel (step 2020 of FIG. 2), the change in shape may deform the channel 1015' and the hollow pipe 1045, creating a uniform channel 1015 in the vessel 1002, as is illustrated in FIG. 4C. Additionally, the hollow pipe 1045 (which has been deformed into a uniform shape) may now line the uniform channel 1015, creating a passageway for the thermal sensor 1030.

FIGS. 5A-5C are cross-sectional schematic illustrations of another example of the formation of a channel. This illustrated formation of the channel may be performed using steps 2015 and 2020 of method 2000 of FIG. 2.

FIGS. 5A-5C may be substantially similar to FIGS. 4A-4C. However, FIGS. 5A-5C may include a heat pipe 1050 (as opposed to a hollow pipe). The heat pipe 1050 may be any structure that may transfer heat. For example, the heat pipe 1050 may be a metal heat pipe (or wire) that is configured to transfer heat from the bottom 1005 of the vessel 1002 into the sidewall 1010. The metal heat pipe may be made of any metal, such as copper or silver. The heat pipe 1050 may be more thermally conductive than the core of the vessel 1002. For example, the heat pipe 1050 may be made of copper or silver when the core of the vessel 1002 is made of aluminum, or the heat pipe 1050 may be made of silver or a metal with a higher thermal conductivity than copper when the core of the vessel is made of copper.

As is illustrated in FIGS. 5A-5C, a non-uniform heat pipe 1050 may be inserted into the non-uniform channel 1015' of the preform 1002'. Then the shape of the preform may be subsequently changed into the shape of a vessel (step 2020 of FIG. 2), causing the channel 1015' and the heat pipe 1050 to deform into a uniform channel 1015 having a heat pipe 1050 that extends upward into the sidewall 1010. At (or in) the sidewall 1010, the heat pipe 1050 may be coupled to a thermal sensor 1030 (not shown). The thermal sensor 1030 (which may include a thermal sensing device 1032 and sensor leads 1034) may sense, detect, measure, and/or determine the temperature transferred by the heat pipe 1050.

Figure 6:
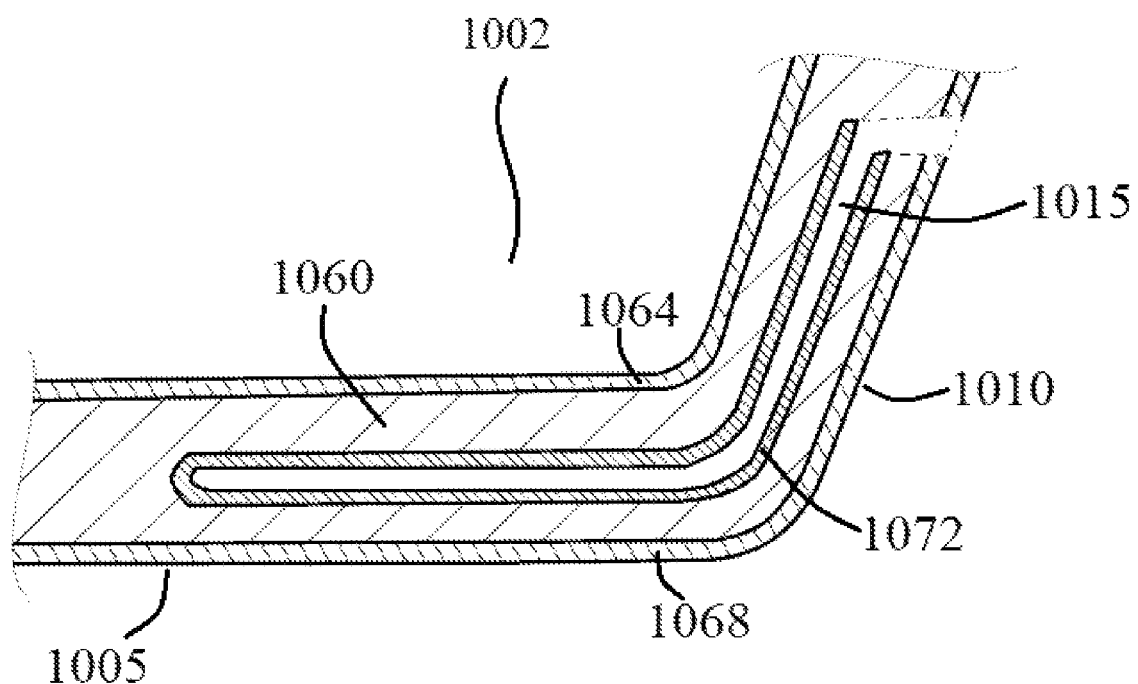
FIG. 6 is a cross-sectional schematic illustration of an example cooking vessel having a clad structure and a channel.

FIG. 6 is a cross-sectional schematic illustration of an example cooking vessel 1002 having a clad structure and a channel 1015. As is illustrated, the cooking vessel 1002 has a continuous clad structure in the bottom 1005 and sidewall 1010 with a core layer 1060 surrounded by an inner cladding 1064 and an outer cladding 1068 in which the channel 1015 is a stainless steel tube 1072 that extends through the core layer 1060 in the bottom 1005 into the sidewall 1010 to position an opening to the tube adjacent a surface of the sidewall 1010.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" refers to "x", "y", or both "x" and "y", whereas "either x or y" refers to exclusivity.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification. In this manner, Applicant reserves the right to amend the claims during prosecution to add features as variously described in this specification.

What is claimed is:

1. A cookware apparatus, comprising
   a. a vessel, comprising:
      i. a bottom;
      ii. a sidewall surrounding the bottom and extending upward from the bottom so as to form a fluid retaining interior region, the sidewall terminating at a rim; and iii. a channel extending through a portion of the bottom and further extending upward into and through a portion of the sidewall, the channel having an opening positioned in an external surface of the sidewall, the vessel having a continuous clad structure in the bottom and sidewall with a core layer surrounded by an inner cladding and an outer cladding in which the channel is a stainless steel tube that extends through the core layer in the bottom into the sidewall to position an opening to the tube adjacent a surface of the sidewall;

b. a thermal sensor positioned within the channel, the thermal sensor extending through the portion of the bottom and further extending upward into and through the portion of the sidewall, the thermal sensor comprising:
  i. a thermal sensing device positioned in the portion of the bottom; and
  ii. one or more sensor leads communicatively coupled to the thermal sensing device, the one or more sensor leads extending from the portion of the bottom upward into and through the portion of the sidewall, the one or more sensor leads further extending out of the opening of the channel, extending within a flange of a handle, extending within the handle, and being coupled to an electronic circuit;

c. the handle coupled to the vessel by the flange, the flange being positioned over the opening of the channel; and d. the electronic circuit positioned on or in the handle, the electronic circuit being operable to receive one or more signals from the thermal sensor and further operable to determine a temperature associated with the vessel based on the one or more signals.

2. A cookware apparatus, comprising
a. a vessel, comprising:
  i. a bottom;
  ii. a sidewall surrounding the bottom and extending upward from the bottom so as to form a fluid retaining interior region, the sidewall terminating at a rim; and
  iii. a channel extending through a portion of the bottom and further extending upward into and through a portion of the sidewall, the channel having an opening positioned in an external surface of the sidewall, the vessel having a continuous clad structure in the bottom and sidewall with a core layer surrounded by an inner cladding and an outer cladding in which the channel is a stainless steel tube that extends through the core layer in the bottom into the sidewall to position an opening to the tube adjacent a surface of the sidewall; and
b. a thermal sensor positioned within the channel, the thermal sensor extending through the portion of the bottom and further extending upward into and through the portion of the sidewall.

3. The apparatus of claim 2, further comprising:
a. a handle coupled to the vessel; and
b. an electronic circuit positioned on or in the handle, the electronic circuit being communicatively coupled to the thermal sensor, the electronic circuit being operable to receive one or more signals from the thermal sensor and further operable to determine a temperature associated with the vessel based on the one or more signals.

4. The apparatus of claim 2, wherein:
a. the thermal sensor comprises:
  i. a thermal sensing device; and
  ii. one or more sensor leads communicatively coupled to the thermal sensing device; and
b. the apparatus further comprises an electronic circuit communicatively coupled to the sensor leads of the thermal sensor, the electronic circuit being operable to receive one or more signals from the thermal sensor and further operable to determine a temperature associated with the vessel based on the one or more signals.

5. The apparatus of claim 4, wherein the thermal sensing device is positioned in the portion of the bottom, and the one or more sensor leads extend from the portion of the bottom upward into and through the portion of the sidewall so as to communicatively couple to the electronic circuit.

6. The apparatus of claim 4, wherein the thermal sensing device extends from the portion of the bottom upward into and through a first area of the portion of the sidewall, and the one or more sensor leads extend from the first area of the portion of the sidewall into and through a second area of the portion of the sidewall so as to communicatively couple to the electronic circuit.

7. The apparatus of claim 4, further comprising:
a. a handle coupled to the vessel by a flange of the handle, the flange being positioned over the opening of the channel;
b. wherein the electronic circuit is positioned on or in the handle; and
c. wherein a portion of the thermal sensor extends out of the opening of the channel, extends within the flange, extends within the handle, and is coupled to the electronic circuit.

8. The apparatus of claim 4, wherein the thermal sensing device is a thermocouple, a thermistor, a thermopile, a Surface Acoustic Waves sensor, or a Bulk Acoustic Waves sensor.

9. The apparatus of claim 2, wherein the vessel is a pot, a pan, a skillet, a sauté pan, a stock pot, or a chefs pan.

10. The apparatus of claim 2, wherein the portion of the bottom of the vessel is monolithic.

* * * * *